United States Patent
Funatsu

(10) Patent No.: US 10,723,137 B2
(45) Date of Patent: *Jul. 28, 2020

(54) CONTROL APPARATUS AND CONTROL METHOD

(71) Applicant: KYOCERA Corporation, Kyoto-shi, Kyoto (JP)

(72) Inventor: Yohei Funatsu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/313,920

(22) PCT Filed: Jun. 15, 2017

(86) PCT No.: PCT/JP2017/022222
§ 371 (c)(1),
(2) Date: Dec. 28, 2018

(87) PCT Pub. No.: WO2018/003536
PCT Pub. Date: Jan. 4, 2018

(65) Prior Publication Data
US 2019/0160829 A1    May 30, 2019

(30) Foreign Application Priority Data
Jun. 28, 2016 (JP) .................. 2016-127640

(51) Int. Cl.
*B41J 2/21* (2006.01)
*H04N 1/405* (2006.01)

(52) U.S. Cl.
CPC .......... *B41J 2/2132* (2013.01); *H04N 1/4053* (2013.01); *H04N 1/4052* (2013.01)

(58) Field of Classification Search
CPC .... B41J 2/04508; B41J 2/2132; B41J 2/2139; B41J 2/362; H04N 1/4052; H04N 1/405; H04N 1/4053
See application file for complete search history.

(56) References Cited

U.S. PATENT DOCUMENTS

| | | | |
|---|---|---|---|
| 5,276,459 A | 1/1994 | Danzuka et al. | |
| 6,178,267 B1* | 1/2001 | Sato | H04N 1/4052 358/3.05 |
| 8,885,221 B2* | 11/2014 | Tanaka | H04N 1/4052 358/1.13 |
| 2005/0248812 A1* | 11/2005 | Udagawa | H04N 5/202 358/3.01 |

FOREIGN PATENT DOCUMENTS

JP    3040425 B2    5/2000

* cited by examiner

*Primary Examiner* — Jannelle M Lebron
(74) *Attorney, Agent, or Firm* — Volpe and Koenig, P.C.

(57) ABSTRACT

A control apparatus for generating a control signal for controlling a printer on the basis of an input signal includes: an arithmetic unit configured to generate an error diffusion processing signal by subtracting, from the input signal, an error diffusion output signal output from a diffusion matrix that determines a distribution of a print density error; a multiplier unit configured to generate an intermediate signal by multiplying the error diffusion processing signal by a correction gain for controlling a correction amount of the print density error; and a quantizer unit configured to generate the control signal by quantizing the intermediate signal.

3 Claims, 5 Drawing Sheets

CONTROL APPARATUS AND CONTROL METHOD

CROSS REFERENCE TO RELATED APPLICATION

This application claims priority to and the benefit of Japanese Patent Application No. 2016-127640 (filed on Jun. 28, 2016), the entire contents of which are incorporated herein by reference.

TECHNICAL FIELD

The present disclosure relates to a control apparatus and a control method.

BACKGROUND

When printing is performed using an ink jet printer, an image output as a print result may have an uneven density distribution with streaks and unevenness due to, for example, the characteristics of the nozzles for ejecting ink droplets. As such, conventional technologies which adjust ink droplet volume in order to prevent the occurrence of streaks and unevenness are known. For example, an apparatus generates correction data on the basis of a density distribution of a print result of a test pattern and adjusts the volume of the ink droplets for image printing on the basis of the correction data.

SUMMARY

A control apparatus according to an embodiment is a control apparatus for generating a control signal for controlling a printer on the basis of an input signal. The control apparatus includes an arithmetic unit, a multiplier unit, and a quantizer unit. The arithmetic unit generates an error diffusion processing signal by subtracting, from the input signal, an error diffusion output signal output from a diffusion matrix that determines a distribution of a print density error. The multiplier unit generates an intermediate signal by multiplying the error diffusion processing signal by a correction gain for controlling a correction amount of the print density error. The quantizer unit generates the control signal by quantizing the intermediate signal.

A control method according to an embodiment is a control method performed by a control apparatus for generating a control signal for controlling a printer on the basis of an input signal. The control method includes a step in which the control apparatus generates an error diffusion processing signal by subtracting, from the input signal, an error diffusion output signal output from a diffusion matrix that determines a distribution of a print density error. The control method includes a step in which the control apparatus generates an intermediate signal by multiplying the error diffusion processing signal by a correction gain for controlling a correction amount of the print density error, and a step in which the control apparatus generates the control signal by quantizing the intermediate signal.

DETAILED DESCRIPTION

In some related cases, an apparatus is not able to appropriately prevent the occurrence of streaks and unevenness. The present disclosure concerns a control apparatus and a control method that are capable of preventing streaks and unevenness in printed images more appropriately.

Figure 4:
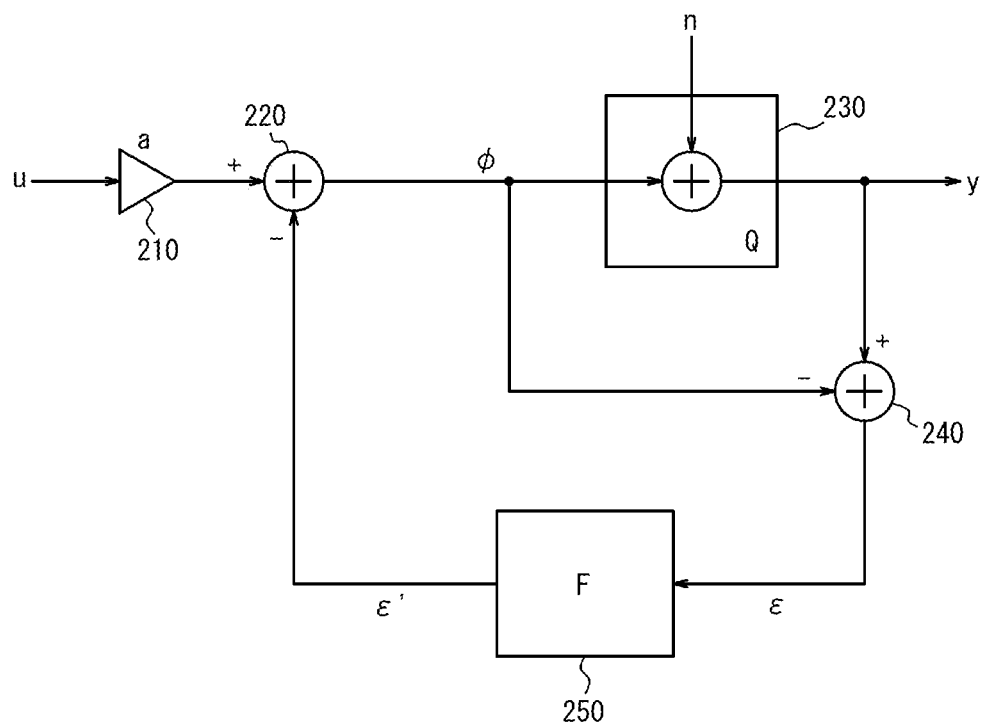
FIG. 4 is a block diagram illustrating an example of a signal processing procedure performed by a conventional printer.

First, an example of signal processing by a conventional printer will be described. FIG. 4 is a block diagram illustrating an example of a signal processing procedure performed by a conventional printer. This printer functions as a control apparatus for performing the processing illustrated in the block diagram of FIG. 4. The printer includes a controller configured to control and manage the printer in its entirety. The controller is constituted by a processor such as a CPU (Central Processing Unit) for executing a program that defines a control procedure.

The controller of the printer generates an image data signal y (an output signal) to be output by performing a predetermined calculation on an image data signal u (an input signal) being input. The controller causes nozzles of the printer to eject ink on the basis of the output signal y. Thus, the printer performs printing. Here, an example in which the controller generates the output signal y by using a conventional so-called error diffusion method will be described.

Here, the printer is described as employing a single pass method. According to printers that employ the single path method, a head carriage provided with nozzles is fixed in the printer and printing is performed by ejecting ink from the nozzles to printing paper being conveyed. The head carriage of the printer includes a plurality of nozzles arranged in a direction orthogonal to the direction (a conveyance direction) in which the printing paper is conveyed during printing.

The controller generates the output signal y with respect to each of the plurality of nozzles of the printer. Here, a generation process for the output signals y performed by the controller will be described. Here, a generation process for the output signal y for controlling the ink ejection from an i-th nozzle located i-th from the right in the conveyance direction will be described. Hereinafter, each signal related to the control of the i-th nozzle will be denoted by a reference numeral with i in subscript.

A block diagram of FIG. 4 includes a multiplier unit 210, a first arithmetic unit 220, a quantizer unit 230, a second arithmetic unit 240, and a diffusion matrix 250. Each of the first arithmetic unit 220 and the second arithmetic unit 240 is constituted by, for example, an adder.

The input signal $u_i$ is input to the multiplier unit 210. The multiplier unit 210 multiplies the input signal $u_i$ by a correction gain $a_i$. The correction gain $a_i$ is used for controlling a correction amount of an error in printing density. The correction gain $a_i$ is defined as an inverse of, for example, a device characteristic $d_i$ of the i-th nozzle. That is, the following equation (1) is satisfied.

$$a_i = 1/d_i \tag{1}$$

Here, the device characteristic $d_i$ represents a characteristic of the printing density of an i-th pixel actually printed by the i-th nozzle. For example, when the device characteristic $d_i=0.5$, the printing density of the i-th pixel printed by the i-th nozzle is half the printing density of a pixel with the device characteristic $d_i=1$. When the device characteristic $d_i$ of the i-th nozzle is $d_i=0.5$ and the device characteristics of the other nozzles are 1.0, printing on the basis of the same input signal without considering the device characteristics causes the printing density of the i-th pixel to be lighter than that of the other pixels, generating streaks in a printed image.

Figure 5:
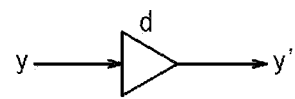
FIG. 5 is a diagram schematically illustrating a variation of the printing density due to a device characteristic.

FIG. 5 is a diagram schematically illustrating a variation of the printing density due to the device characteristic $d_i$. In response to a control signal $y_i$ for the i-th nozzle, a variation is caused by the device characteristic $d_i$, resulting in actual printing density of $y'_i$. A relationship between the printing density $y'_i$ and the control signal $y_i$ is expressed by the following equation (2).

$$y'_i = y_i * di \tag{2}$$

The first arithmetic unit 220 generates an intermediate signal $\varphi_i$ by subtracting, from a signal output by the multiplier unit 210, an error diffusion output signal $\varepsilon'_i$ from the diffusion matrix 250. The diffusion matrix 250 is an error distribution table used in the error diffusion method, and will be described in detail later. The intermediate signal $\varphi_i$ is expressed by the following equation (3).

$$\varphi_i = a_i * u_i - \varepsilon'_i \tag{3}$$

As described above, the conventional printer multiplies the correction gain before subtracting the error diffusion output signal $\varepsilon'_i$.

The quantizer unit 230 generates a control signal $y_i$ by quantizing the intermediate signal $\varphi_i$. A quantization error n is input to the quantizer unit 230. In the present example, the quantization error n is equal to the error diffusion input signal $\varepsilon'_i$. The control signal $y_i$ is expressed by the following equation (4) by using a function Q representing the quantization processing.

$$y_i = Q(\varphi_i) \tag{4}$$

The printer prints on the basis of the control signal $y_i$ calculated from the equation (4).

Figure 6:
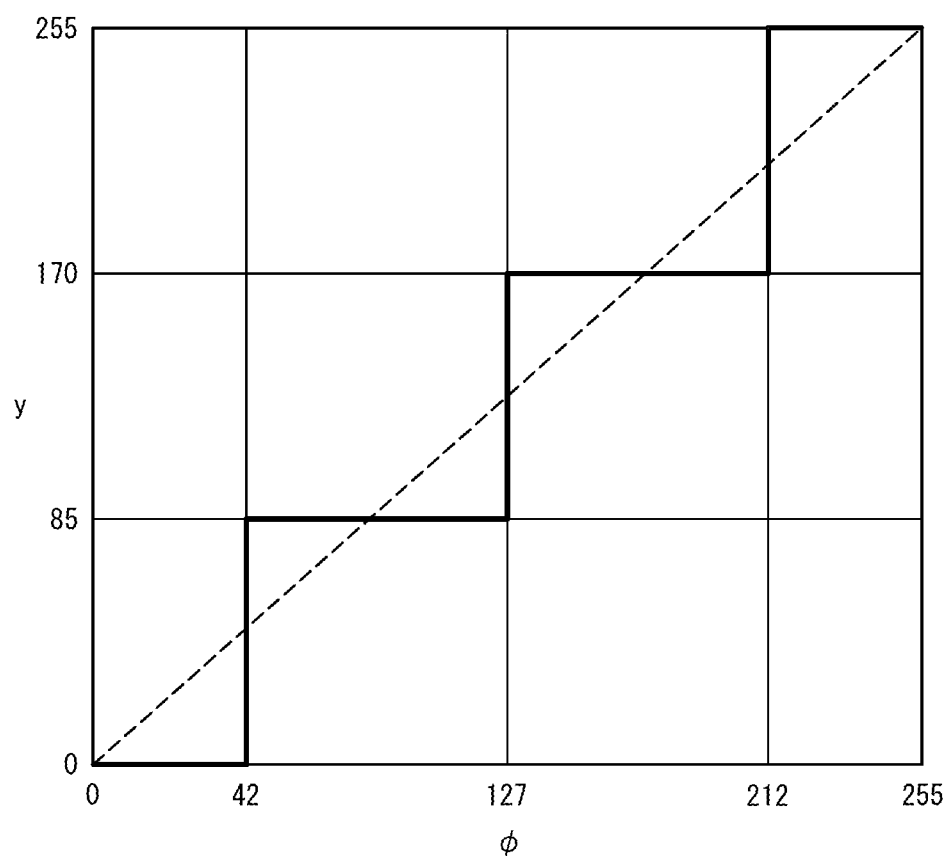
FIG. 6 is a graph illustrating an input-output relationship of a signal in a quantizer unit.

FIG. 6 is a diagram illustrating an example of a signal input-output relationship in the quantizer unit 230. FIG. 6 illustrates an example in which the signal processed by the controller is 8 bits. In this example, as illustrated in FIG. 6, the quantizer unit 230 generates the control signal $y_i$ in a stepped form in response to the intermediate signal $\varphi_i$.

The second arithmetic unit 240 generates the error diffusion input signal $\varepsilon_i$ by subtracting the intermediate signal $\varphi_i$ from the control signal $y_i$. The error diffusion input signal $\varepsilon_i$ is expressed by the following equation (5).

$$\varepsilon_i = Q(\varphi_i) - \varphi_i \tag{5}$$

The error diffusion input signal $\varepsilon_i$ is input to the diffusion matrix 250. The diffusion matrix 250 generates an error diffusion output signal $\varepsilon'_{i+1}$ by performing a predetermined processing on the basis of the error diffusion input signal $\varepsilon_i$. The diffusion matrix 250 is, for example, the error distribution table experimentally set on the basis of a relative distance to a target pixel (the pixel printed by the i-th nozzle). In the present embodiment, the diffusion matrix 250 has a characteristic whereby all of the error in the printing density is diffused to the next pixels. The error diffusion output signal $\varepsilon'_{i+1}$ is used, as error feedback by error diffusion, for the generation of the control signal $y_{i+1}$ for the i+1 nozzle. When the diffusion matrix 250 has the above characteristic, the error diffusion output signal $\varepsilon'_{i+1}$ output from the diffusion matrix 250 is expressed by the following equation (6) by using a function F indicating processing by the diffusion matrix 250.

$$\varepsilon'_{i+1} = F(\varepsilon_i) \tag{6}$$

In the present example, a signal with the same value as the error diffusion input signal $\varepsilon_i$ is output as the error diffusion output signal $\varepsilon'_{i+1}$.

In this way, the controller generates the control signal $y_i$ on the basis of the input signal $u_i$.

Here, the signal processing by the controller will be described by using specific values. Here, the input signals to i−2 to the i−1 nozzles are 111 by 8 bit conversion. That is, $u_{i-2}=u_{i-1}=u_i=u_{i+1}=111$ is satisfied.

As for the device characteristics of the nozzles, further, the device characteristic $d_i$ of the i-th nozzle is expressed by $d_i=0.5$, and the device characteristic $d_{i-2}$, the device characteristic $d_{i-1}$, and the device characteristic $d_{i+1}$ of the i−2 nozzle, the i−1 nozzle, and the i+1 nozzle, respectively, satisfy $d_{i-2}=d_{i-1}=d_{i+1}=1.0$. By using the above equation (1), in this case, the correction gain $a_i$ of the i-th nozzle is $a_i=1/d_i=2.0$. Also, the correction gains $a_{i-2}$, $a_{i-1}$, and $a_{i+1}$ of the i−2 nozzle, i−1 nozzle, and i+1 nozzle satisfy $a_{i-2}=a_{i-1}=a_{i+1}=1.0$.

Further, an error diffusion output signal $\varepsilon'_{i-3}$ used for the generation of a control signal $y_{i-2}$ for the i−2 nozzle is assumed to satisfy $\varepsilon'_{i-3}=0$.

Under the above condition, the control signals for the i−2 to i+1 nozzles results in the following equations:

$$y'_{i-2}=85, y'_{i-1}=170, y'_i=170, y'_{i+1}=170$$

Thus, by using the above equation (2), the printing density of the printed image satisfies the following equations.

$$y'_{i-2}=85, y'_{i-1}=170, y'_i=85, y'_{i+1}=170$$

In order to correct the characteristic variation of the i-th nozzle in the preceding and following pixels, an average printing density $y'_{ave}$ of the three pixels, i-th pixel, i−1 pixel, and i+1 pixel, needs to correspond to an average value of the input signals. In the above example, the average printing density $y'_{ave}$ of is expressed by $y'_{ave}=(y'_{i-1}+y'_i+y'_{i+1})/3 \approx 141$.

On the other hand, the average value $u_{ave}$ of the input signals for the control of the i-th nozzle, the i−1 nozzle, and the i+1 nozzle is 111.

Accordingly, an average density deviation amount $\Delta y$ of the average printing density $y'_{ave}$ from an ideal input signal average value $u_{ave}$ is expressed as $\Delta y = y'_{ave} - u_{ave} = 30$. As the average density deviation amount $\Delta y$ becomes smaller, the characteristic variation of the i-th nozzle is corrected in the preceding and following pixels, and a state in which unevenness and streaks do not occur is approached. The larger a positive value of the average density deviation amount $\Delta y$, the darker the printing density. The larger the negative value of the average density deviation amount $\Delta y$, the lighter the printing density. That is, as an absolute value of the average density deviation amount $\Delta y$ becomes larger, unevenness and streaks become more obvious.

Next, a printer according to the present embodiment which is capable of appropriately preventing the streaks and unevenness described above will be described.

Figure 1:
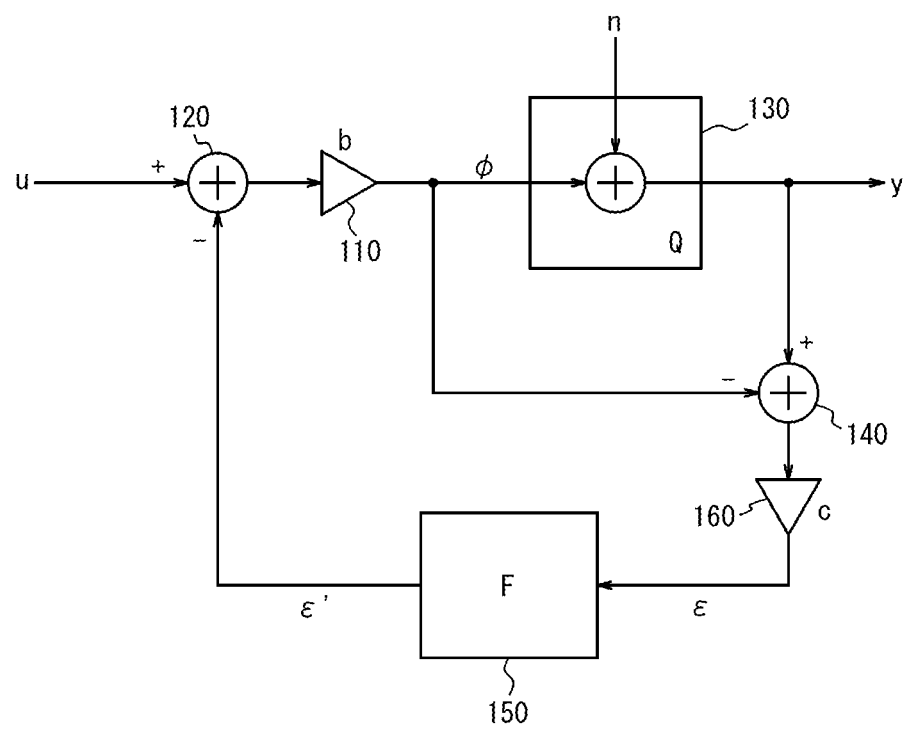
FIG. 1 is a block diagram illustrating an example of a signal processing procedure performed by a printer according to an embodiment.

FIG. 1 is a block diagram illustrating an example of a signal processing procedure performed by a printer according to an embodiment. The printer functions as a control apparatus for performing the processing illustrated in the block diagram of FIG. 1. The block diagram of FIG. 1 includes a first multiplier unit 110, a first arithmetic unit 120, a quantizer unit 130, a second arithmetic unit 140, a diffusion matrix 150, and a second multiplier unit 160. Each of the first arithmetic unit 120 and the second arithmetic unit 140 is constituted by, for example, an adder.

According to the present embodiment, the first multiplier unit 110 is arranged between the first arithmetic unit 120 and the quantizer unit 130. According to the present embodiment, that is, the first multiplier unit 110 performs processing after the first arithmetic unit 120 performs processing. The second multiplier unit 160 is arranged between the second arithmetic unit 140 and the diffusion matrix 150. Here, a process for generating the control signal $y_i$ performed by the controller according to the present embodiment will be described.

According to the present embodiment, the input signal is input to the first arithmetic unit 120. The first arithmetic unit 120 generates the error diffusion processing signal by subtracting the error diffusion output signal $\varepsilon'_i$ from the input signal $u_i$. The first multiplier unit 110 generates the intermediate signal $\varphi_i$ by multiplying the error diffusion processing signal by a correction gain $b_i$. As with the correction gain $a_i$, for example, the correction gain $b_i$ is defined as the inverse of the device characteristic $d_i$. The intermediate signal $\varphi_i$ is expressed by the following equation (7).

$$\varphi_i = b_i * (u_i - \varepsilon'_i) \quad (7)$$

The quantizer unit 130 generates the control signal $y_i$ by quantizing the intermediate signal $\varphi_i$. The quantizing processing by the quantizer unit 130 according to the present embodiment may be similar to, for example, the quantizing processing by the quantizer unit 230 described with reference to FIG. 6. Thus, detailed descriptions of the quantizing processing will be omitted. The control signal $y_i$ is expressed by the following equation (8), in which the function Q represents the quantizing processing.

$$y_i = Q(\varphi_i) \quad (8)$$

The second arithmetic unit 140 subtracts the intermediate signal $\varphi_i$ from the control signal $y_i$. According to the present embodiment, further, the second multiplier unit 160 generates the error diffusion input signal $\varepsilon_i$ by processing the signal generated by the second arithmetic unit 140. The second multiplier unit 160 multiplies an inverse $c_i$ of the correction gain. That is, $c_i = 1/b_i$ is satisfied. Accordingly, the error diffusion input signal $\varepsilon_i$ is expressed by the following equation (9).

$$\varepsilon_i = c_i * (Q(\varphi_i) - \varphi_i) \quad (9)$$

The diffusion matrix 150 generates the error diffusion output signal $\varepsilon'_{i+1}$ by performing a predetermined processing on the error diffusion input signal $\varepsilon_i$ being input. The error diffusion output signal $\varepsilon'_{i+1}$ output from the diffusion matrix 150 is expressed by the following equation (10), in which the function F represents the processing by the diffusion matrix 150.

$$\varepsilon'_{i+1} = F(\varepsilon_i) \quad (10)$$

In the present example, a signal with the same value as the error diffusion input signal $\varepsilon_i$ is output as the error diffusion output signal $\varepsilon'_{i+1}$ from the diffusion matrix 150. The control signal $y_{i+1}$ for the i+1 nozzle is calculated by using the error diffusion output signal $\varepsilon'_{i+1}$.

Here, the signal processing by the controller will be described by using specific values, similarly to the example of the processing by the conventional printer described above. For comparison with the example described above, the input signal u and the device characteristic d are the same values as those used in the above example. That is, the input signal to the i−2 to i+1 nozzles is 111 by 8 bit conversion ($u_{i-2}=u_{i-1}=u_i=u_{i+1}=111$). The device characteristic $d_i$ of the i-th nozzle is $d_i=0.5$, and the device characteristics $d_{i-2}$, $d_{i-1}$, and $d_{i+1}$ of the i−2 nozzle, the i−1 nozzle, and the i+1 nozzle satisfy $d_{i-2}=d_{i-1}=d_{i+1}=1.0$. Thus, the correction gain $b_i$ of the i-th nozzle is $b_i=1/d_i=2.0$, and the correction gains $b_{i-2}$ of the i−2 nozzle, $b_{i-1}$ of the i−1 nozzle, and $b_{i+1}$ of the i+1 nozzle satisfy $b_{i-2}=b_{i-1}=b_{i+1}=1.0$. Thus, for the inverse c of the correction gain, ci=0.5 and $c_{i-2}=c_{i-1}=c_{i+1}=1.0$ are calculated. Further, the error diffusion output signal $\varepsilon'_{i-3}$ used for the generation of the control signal $y_{i-2}$ for the i−2 nozzle satisfies $\varepsilon'_{i-3}=0$.

Under the above condition, the control signals for the i−2 to i+1 nozzles are calculated as follows.

$$y_{i-2}=85, y_{i-1}=170, y_i=170, y_{i+1}=85$$

Accordingly, due to the device characteristic d of each of the i−2 to i+1 nozzles, the printing density of the image printed by each of the nozzles satisfies:

$$y'_{i-2}=85, y'_{i-1}=170, y'_i=85, y'_{i+1}=85$$

Thus, the average printing density $y'_{ave}$ is expressed by $y'_{ave}=(y'_{i-1}+y'_i+y'_{i+1})/3 \approx 113$.

The average $u_{ave}$ of the input signals for the control of the i-th nozzle, the i−1 nozzle, and the i+1 nozzles is 111. Thus, an average density deviation amount $\Delta y$ of the average printing density $y'_{ave}$ from the ideal input signal average value $u_{ave}$ is expressed by $\Delta y = y'_{ave} - u_{ave} = 2$. Therefore, the average density deviation amount $\Delta y$ of the signals processed by the printer according to the present embodiment is smaller than the average density deviation amount $\Delta y$ of the signals processed by the conventional printer described in the above example. Under the above condition, accordingly, the processing by the printer according to the present embodiment corrects the characteristic variation of the i-th nozzle in its preceding and following pixels, unlike the processing by the conventional printer. Thus, streaks and unevenness are less likely to occur.

Figure 2:
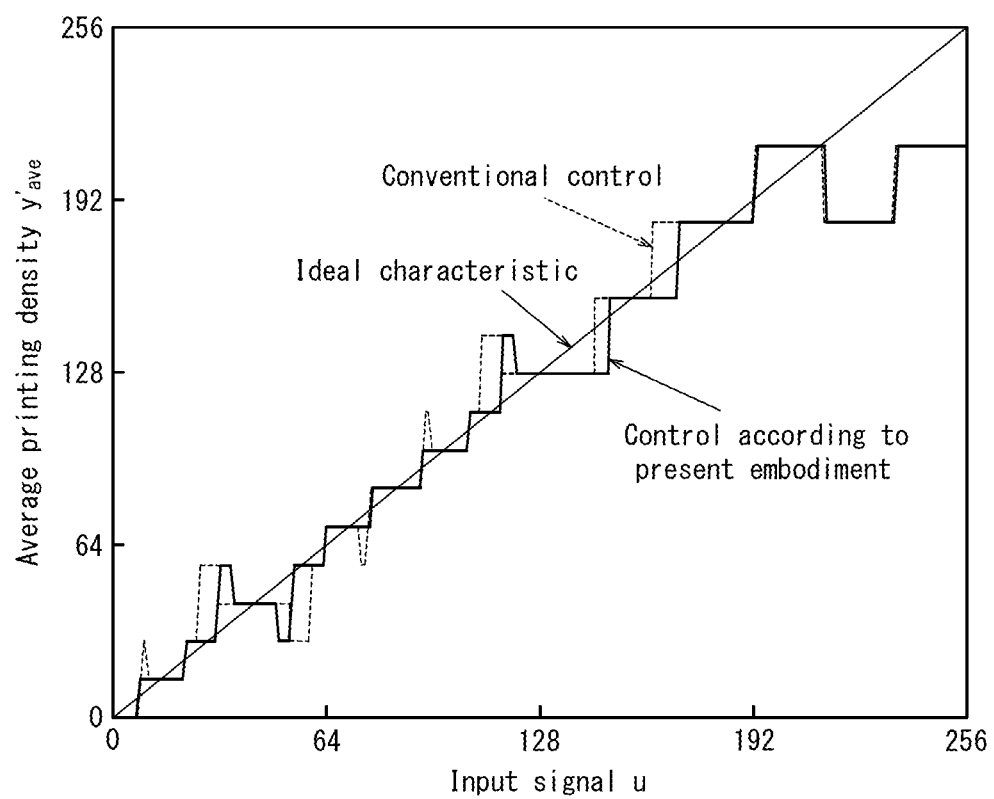
FIG. 2 is a graph illustrating a relationship between an input signal and a print density average value.

FIG. 2 is a diagram illustrating a relationship between the input signal u and the average printing density $y'_{ave}$ of the three pixels. That is, FIG. 2 is a diagram illustrating the relationship of the average printing density $y'_{ave}$ of the three pixels with respect to the i-th nozzle and its preceding and following nozzles (i.e., the i−1 nozzle and i+1 nozzle) within the range in which the input signal $u_i$ is between 0 and 255. FIG. 2 illustrates the input signal u and the average printing density $y'_{ave}$ according to the ideal characteristic, the characteristic of the conventional control, and the characteristic of the control according to the present disclosure. As illustrated in FIG. 2, when averaged across 0 to 255 in whole, the characteristic provided by the control according to the present embodiment is closer to the ideal characteristic than the characteristic provided by the conventional control.

Figure 3:
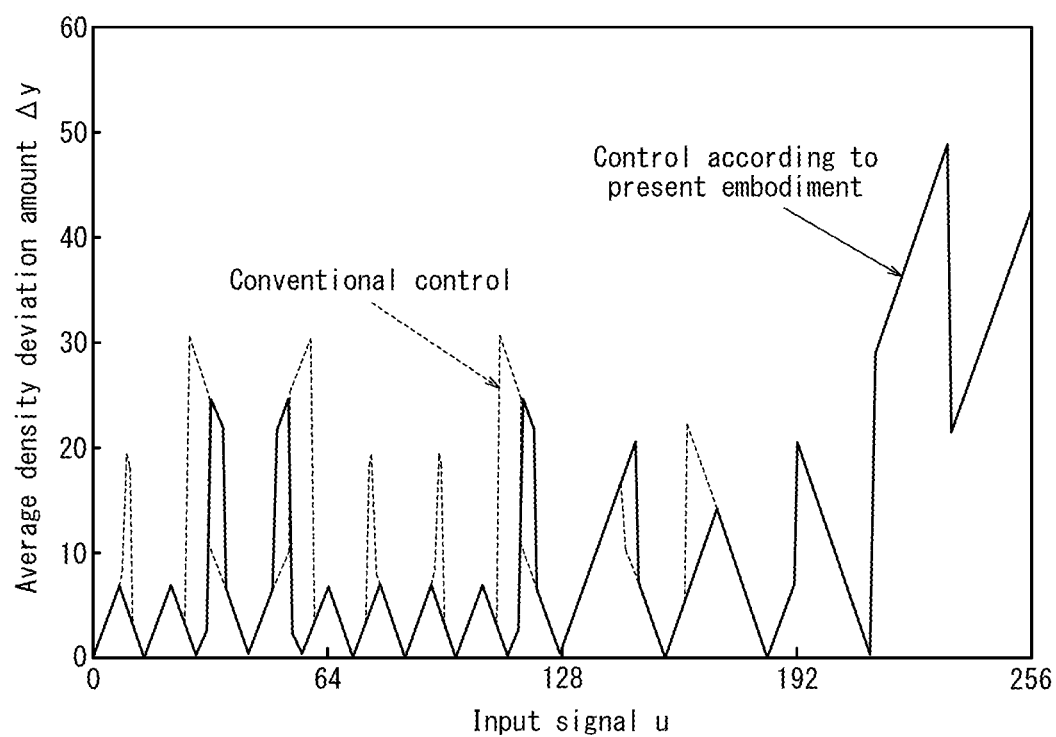
FIG. 3 is a graph illustrating an average density deviation amount of the print density.

FIG. 3 is a diagram illustrating an average density deviation amount $\Delta y$ of the printing density. FIG. 3 illustrates magnitudes (absolute values) of the average density deviation amount $\Delta y$ with respect to the ideal value according to the conventional control and the control of the present disclosure. In FIG. 3, when averaged over the entire range of the input signal $u_i$ of 0 to 255, the average density deviation amount $\Delta y$ according to the control of the present embodiment is smaller than that according to the conventional control. Thus, the printer (the control apparatus) of the present embodiment may correct streaks and unevenness more appropriately than the conventional control.

It is to be appreciated that the present disclosure is not limited to the above embodiment, and various modifications and changes are possible. For example, functions and the like included in each component may be rearranged without logical inconsistency, so as to combine a plurality of components together or to separate them.

For example, in the above embodiment the processing by the second multiplier unit 160 does not necessarily need to be performed. That is, the error diffusion input signal ε may be a difference between the control signal y and the intermediate signal φ generated by the second arithmetic unit 140. In this configuration, also, streaks and unevenness may be more appropriately corrected than in the conventional control.

The invention claimed is:

1. A control apparatus for generating a control signal for controlling a printer on the basis of an input signal, the control apparatus comprising:
   an arithmetic unit configured to generate an error diffusion processing signal by subtracting, from the input signal, an error diffusion output signal output from a diffusion matrix that determines a distribution of a print density error;
   a multiplier unit configured to generate an intermediate signal by multiplying the error diffusion processing signal by a correction gain for controlling a correction amount of the print density error; and
   a quantizer unit configured to generate the control signal by quantizing the intermediate signal.

2. The control apparatus according to claim 1, further comprising:
   a second multiplier unit configured to generate a diffusion matrix input signal to be input to the diffusion matrix by multiplying a difference between the error diffusion output signal and the intermediate signal by an inverse of the correction gain.

3. A control method performed by a control apparatus for generating a control signal for controlling a printer on the basis of an input signal, the control method comprising:
   generating an error diffusion processing signal by subtracting, from the input signal, an error diffusion output signal output from a diffusion matrix that determines a distribution of a print density error;
   generating an intermediate signal by multiplying the error diffusion processing signal by a correction gain for controlling a correction amount of the print density error; and
   generating the control signal by quantizing the intermediate signal.

* * * * *